Patented July 2, 1929.

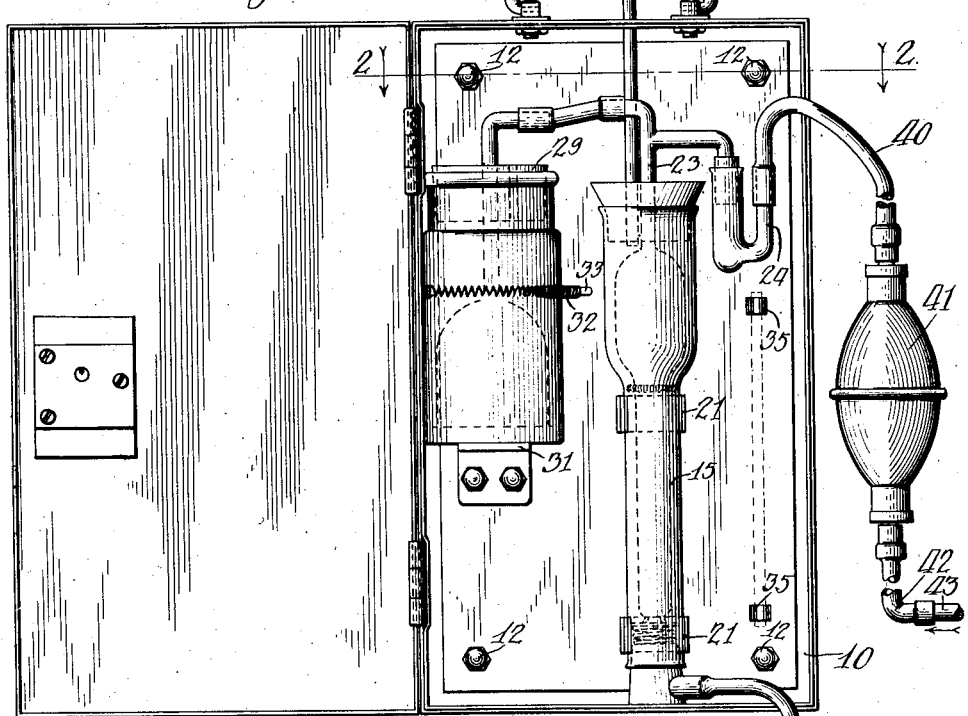
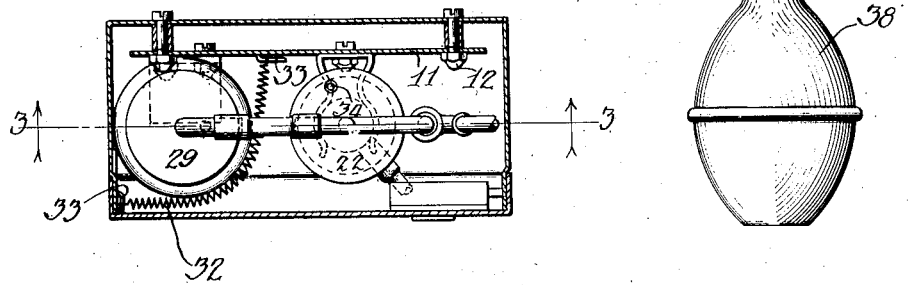

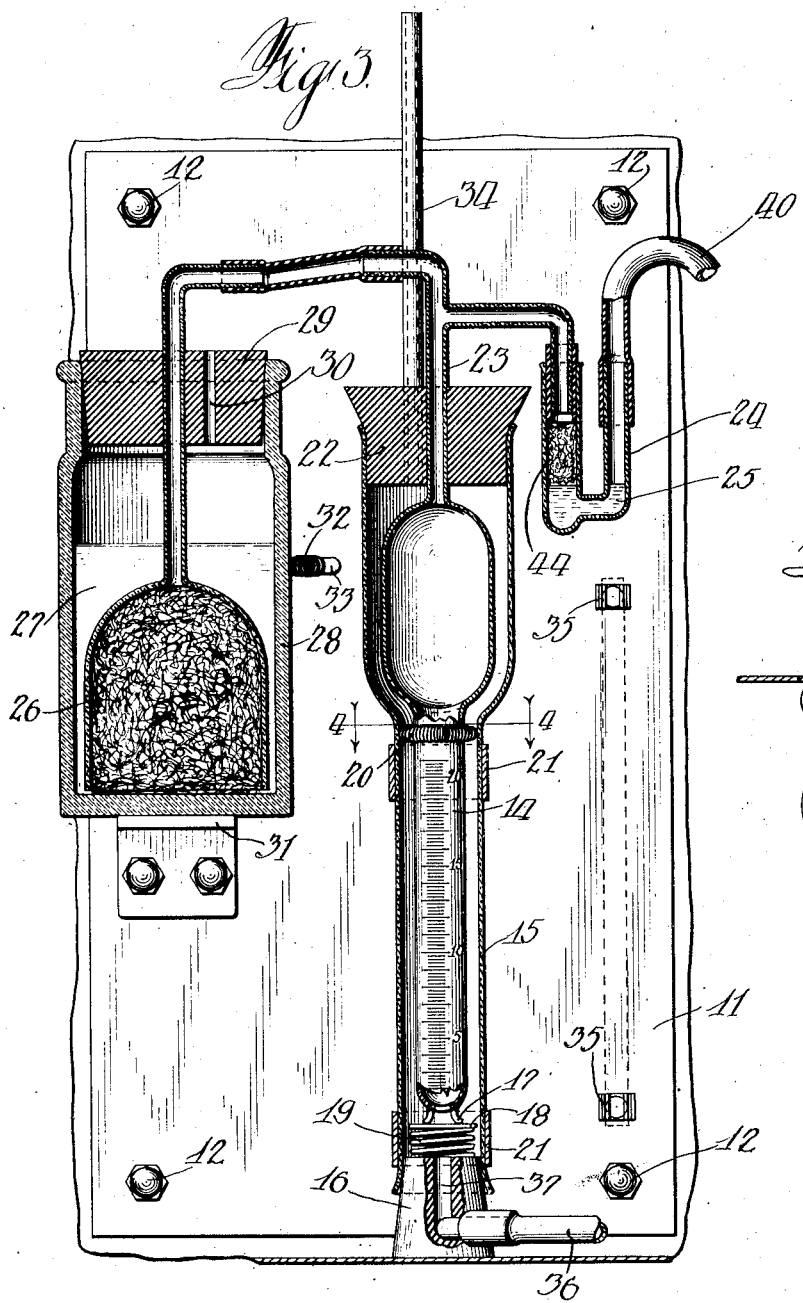
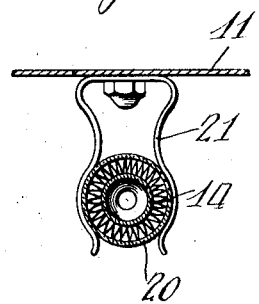

1,719,593

UNITED STATES PATENT OFFICE.

ARTHUR B. CUNNINGHAM, OF CHICAGO, ILLINOIS, ASSIGNOR TO REPUBLIC FLOW METERS CO., OF CHICAGO, ILLINOIS, A CORPORATION OF ILLINOIS.

GAS ANALYZER.

Application filed May 19, 1923. Serial No. 640,032.

This invention relates to an instrument for determining the percentage of one or more of the constituents present in a gas and has for its object the provision of such a device which shall be accurate and convenient in operation, and economical to manufacture.

The invention is exemplified in the combination and arrangement of parts shown in the accompanying drawings and described in the following specification, and it is more particularly pointed out in the appended claims.

In the drawings—

Fig. 1 is an elevation of an embodiment of the invention showing the door of the containing case open;

Fig. 2 is a section on line 2—2 with the door closed;

Fig. 3 is a vertical section substantially on line 3—3 of Fig. 2; and

Fig. 4 is a transverse section on line 4—4 of Fig. 3.

The embodiment of the invention shown in the drawings is designed especially for ascertaining the percentage of carbon dioxide in gas, such as that from the flue of a power plant, but it will be understood that the invention is not confined to analysis of any particular gas, but is applicable to any form of analysis in which one or more of the gas constituents may be absorbed by a suitable solvent.

As shown in the drawings, the various portions of the instrument are housed in a casing of any suitable form designated by the numeral 10. For convenience of manufacture the parts of the instrument may be mounted on a panel 11 which is removably secured to the wall of the casing by bolts or screws 12. This mounting of the instrument parts within a casing renders the set easily portable and a handle 13 may be provided for carrying the instrument.

A measuring burette 14 is enclosed in a jacket 15, the jacket being open at its lower end and provided with a stopper 16 of rubber or other suitable material, the jacket and burette being made of glass. The burette 14 is open at its lower end and provided with spaced feet 17 which rest upon a disc 18 supported by a spring 19 placed upon the upper end of the stopper 16. This provides a resilient support for the burette and prevents danger of breaking from jars. A coil spring 20 surrounds the burette 14 and is interposed between its outer periphery and the inner wall of the jacket 15 to hold the two walls in proper spaced relation to one another. Suitable spring clips 21 engage the jacket 15 and are carried on the panel 11 for supporting the jacket and its enclosed burette.

The upper end of the jacket 15 is fitted with a stopper 22 through which the tube 23 from the upper end of the burette passes. The tube 23 is provided with two branches, one leading to a U-tube 24 having a mercury seal 25, and the other leading to an absorption chamber 26. The absorption chamber 26 comprises an inverted bell immersed in the solvent liquid 27 which for carbon dioxide may be a solution of caustic potash. A jar 28 is provided for the caustic potash solution and is fitted with a stopper 29 having a vent 30 to the atmosphere. A bracket 31 supports the jar 28 which is removably held in place on the bracket by an elastic member 32 having its ends detachably held to the case by hooks 33. The interior of the absorption chamber may be filled with loose material, such as steel wool, for increasing the surface within the chamber to facilitate the absorption of the $CO_2$ gas.

The jacket 15 is provided with a vent tube 34 which extends through the top of the casing to the outer atmosphere. Spring clips 35 are attached to the panel 11 for holding the tube 34 when the instrument is packed for transportation. A flexible tube 36 communicates with the interior of the jacket 15 through a passage 37 in the stopper 16. The free end of the tube 36 is connected with a rubber bulb 38 through a stopper 39 which is removably fitted to the bulb.

One leg of the U-tube 24 is connected by a flexible tube 40 with the discharge end of an aspirator bulb 41. The intake end of the bulb 41 is connected by a tube 42 with the source of gas to be tested, the source being indicated in the present instance as a pipe or tube 43. Within the U-tube 24 above the mercury 25 there may be placed a wad of loosely packed cotton 44 which acts as a filter for preventing solid particles from entering the measuring burette and which prevents the mercury 25 from being forced into the burette.

In operation, the parts are assembled as shown in the drawings, the bulb 38 having been filled with water and the stopper 39 replaced in the end of the bulb. The aspirator bulb 41 is then compressed and allowed to expand several times until sufficient gas is pumped from the source 43 through the seal 25 and burette 14 to displace the air in the burette and its surrounding jacket. Six or more compressions and expansions should be permitted to insure complete charge of the instrument with the gas to be tested. The incoming gas passes down through the burette and escapes from the opening at the bottom thereof into the surrounding jacket forcing the air out through the vent 34. During the charging of the instrument there should be no water in the jacket above the opening at the lower end of the burette since it is desirable to measure the gas to be tested at atmospheric pressure. A definite quantity of the gas will be entrapped in the burette. After the gas has thus been pumped through the instruments by the aspirator 41 until a complete new charge is insured the bulb 38 may be slowly compressed, forcing water into the lower end of the jacket 15. The water will rise within the jacket, sealing off the lower opening of the burette and thus enclosing a measured quantity of gas therein. As the water rises within the jacket the head thus provided will produce a pressure at the lower end of the burette forcing the gas through the tube 23 and into the absorption chamber 26. As the gas enters the absorption chamber it will come into contact with the potash solution 27 and the carbon dioxide will be absorbed therefrom. The bulb 38 should be compressed until the water level within the burette rises to near the top of the burette. The bulb should then be permitted to expand and the operation repeated two or three times to insure complete contact of the entrapped gas with the potash and give opportunity for complete absorption of the carbon dioxide in the gas. When all of the $CO_2$ gas is absorbed the bulb is permitted to expand to allow the column of water in the jacket to recede until the surface level of the water in the jacket is nearly even with the surface level in the burette, but sufficiently above the level in the burette so that it will not interfere with the reading on the burette scale. The reading of the instrument is then taken by observing the position of the bottom of the meniscus at the surface of the water in the burette. The height of the column in the burette indicates the amount of carbon dioxide which has been absorbed by the potash solution and the burette is calibrated so as to read percentage of carbon dioxide directly. The reading is taken when the two columns are substantially on a level with one another so as to give the reading at atmospheric pressure within the burette.

In practice it has been found that the water may be controlled more accurately if the water bulb is held inverted or on its side during the making of a test. To take a new charge of gas after the completion of a test the aspirator bulb should be compressed to expel the water from the measuring burette. The water bulb may then be held with the tube end upward and then pressed slightly to expel any air from the bulb. The pressure is then released to draw all the water from the burette and jacket into the bulb. The new charge may then be pumped into the burette by the aspirator and the new test made by repeating the operation as previously described.

To test the instrument for a gas leak the water should all be drawn from the bulb and jacket and the aspirator disconnected from the gas supply and operated to pump the instrument full of air and remove all gas. The water bulb is then compressed to force the water to the top of the burette in which position it is held for a short time. The water is then carefully permitted to flow back into the bulb and if there is no leak in the connections the two water levels will meet at the lower end of the burette. If there is a leak in the tubing the leak will permit atmospheric pressure on top of the water in the burette so that the pressure in the burette and jacket will be balanced and the water levels will meet above the bottom of the burette.

I claim:—

1. A gas analyzer comprising a measuring chamber positioned within a transparent jacket and communicating therewith adjacent the bottom of said measuring chamber, said jacket having communication at the top thereof with the atmosphere, and means for supplying liquid to said jacket and measuring chamber and for removing liquid therefrom until the level of the liquid in said measuring chamber and in said jacket are equally high thereby providing atmospheric pressure in said measuring chamber.

2. A gas analyzer comprising a measuring chamber, a jacket enclosing said measuring chamber and communicating therewith adjacent the bottom of said measuring chamber, said jacket having communication at the top thereof with the atmosphere, and means for supplying liquid to said jacket and measuring chamber and for regulating the quantity of liquid in said jacket for producing atmospheric pressure in said measuring chamber.

3. A gas analyzer comprising a measuring chamber, a transparent jacket surrounding said measuring chamber and communicating therewith adjacent the bottom of said measuring chamber, said jacket having communication at the top thereof with the atmosphere, hand controlled means for supplying gas to said measuring chamber, hand controlled means for supplying liquid to said jacket to replace said gas and subject the same to the action of a solvent for constituents thereof and for balancing the columns of liquid in said jacket and measuring chamber to obtain atmospheric pressure in the same.

4. A gas analyzer comprising a measuring burette, a jacket surrounding said burette and communicating therewith adjacent the bottom of said burette, said jacket having communication at the top thereof with the atmosphere, means for supplying gas to said burette, and means for supplying liquid to said burette and jacket to force the gas from said burette.

5. In combination, a burette, a jacketing chamber surrounding said burette and communicating therewith adjacent the bottom of said burette, said jacketing chamber having communication at the top thereof with the atmosphere, a conduit for communicating with the top of said burette, a liquid seal in said conduit, a one-way pump for forcing gas from said conduit into said burette, and an absorption chamber communicating with said burette for receiving gas therefrom, said absorption chamber comprising a vessel open at its bottom and immersed in a solvent for a constituent of the gas tested.

6. In combination, a burrette, a jacketing chamber surrounding said burrette, said burette being open at its bottom to communicate with said chamber, means for supplying gas to be tested to the upper portion of said burette, means for preventing the return of said gas to the source of supply, means for supplying a liquid to said jacket to force the gas in the burette upwardly therefrom, an absorption chamber connected with the upper portion of said burette, said absorption chamber comprising an inverted bell immersed in a solvent for a constituent of the gas to be tested, and means within said bell to provide an extended surface to facilitate the action of said solvent on said gas.

7. In combination, a burette having a surrounding jacket, said burette being open at its lower end to communicate with said jacket, an absorption chamber connected with the upper portion of said burette, means for supplying gas to said burette, and a hand bulb for supplying liquid to said jacket and burette to force the gas from said burette into said absorption chamber, said bulb being expansible to withdraw the liquid from said burette and permit return of the gas thereto to indicate the amount of gas absorbed in said absorption chamber.

8. In combination, a burette having a surrounding jacket, said burette being open at its lower end to communicate with said jacket, an expansion bulb connected with said jacket for supplying liquid thereto and for withdrawing liquid therefrom, an aspirator bulb for supplying gas to said burette, and an absorption chamber connected with said burette, said absorption chamber being enclosed in a container for receiving a liquid for absorbing a constituent of the gas supply to said burette and for forming a liquid seal for said absorption chamber.

9. In combination, a measuring burette having a surrounding jacket, said burette being open at its lower end to communicate with said jacket, a bulb for supplying liquid to said jacket and burette at the lower end thereof and for withdrawing the liquid therefrom, an aspirator for supplying gas to the upper portion of said burette, a vent for the upper portion of said jacket to permit the escape of gas therefrom as it is supplied to said burette, a liquid seal for preventing return of gas to the source of supply, an absorption chamber connected with the upper end of said burette, said absorption chamber comprising an inverted bell, a container in which said bell is positioned for receiving a solvent for a constituent of the gas to be tested, said solvent acting as a liquid seal for said absorption chamber, the upper portion of said container being vented to atmosphere, and a scale for indicating the height of liquid in said burette, said scale being calibrated to indicate percentage of the capacity of said burette.

10. In combination, a supporting member, a tubular jacketing member mounted on said supporting member, a burette arranged within said jacketing member, a spring cushion for supporting said burette within said jacketing member, and resilient means for spacing said burette from the walls of said jacketing member.

11. In combination, a carrying case, spring clips mounted within said carrying case, a tubular glass member supported by said clips, a measuring burette arranged within said glass member, a spring upon which said burette rests, resilient means for spacing said burette from said tubular glass member, a hand pump communicating with said burette, and flexible tubing connecting said pump with said burette to permit said pump to be stored within said carrying case.

12. A gas analyzer comprising a measuring burette open at its bottom, a jacket having a relief vent surrounding said burette, means for supplying gas to said burette, and means for flooding said jacket with a liquid to force the gas from said burette.

13. A gas analyzer comprising a burette open at its bottom, a container surrounding said burette having a relief vent therein, means for supplying gas to the upper portion of said burette, means for flooding said container with water to force the gas from said burette, and an absorption chamber for receiving the gas forced from said burette.

14. A gas analyzer comprising a measuring burette open at its bottom, a container surrounding said burette having an opening therein to atmosphere, means connected with the top of said burette for supplying gas thereto, means for filling said container with water to force the gas from said burette, and an absorption chamber having a liquid seal for receiving the gas from said burette and for returning the gas thereto when the water is withdrawn from said container.

15. A gas analyzer comprising a measuring burette open at its bottom, a container having an air vent to atmosphere therein, said container surrounding said burette and forming a chamber therefor, means connected with the top of said burette for supplying gas thereto, means for supplying liquid to said jacket and for withdrawing liquid therefrom, an absorption chamber for receiving gas from said burette when liquid is introduced into said jacket, a seal for preventing the return of gas from said burette to its source of supply, and a scale for indicating the amount of gas absorbed in said absorption chamber when the liquid is withdrawn from said jacket to permit the return of the gas to said burette.

In testimony whereof I have signed my name to this specification on this 9th day of May, A. D. 1923.

ARTHUR B. CUNNINGHAM.